United States Patent
Koskinen et al.

(10) Patent No.: US 11,618,647 B2
(45) Date of Patent: Apr. 4, 2023

(54) ELEVATOR CAR PARKING BRAKE (71) Applicant: Kone Corporation, Helsinki (FI)

(72) Inventors: Antti Koskinen, Helsinki (FI); Antti I Maki, Helsinki (FI); Jukka Turpeinen, Helsinki (FI); Hilkka Hamalainen, Helsinki (FI); Antti Saarelainen, Helsinki (FI); Henri Wenlin, Helsinki (FI); Mikko Puranen, Helsinki (FI); Timo Vlasov, Helsinki (FI); Jukka Penttila, Helsinki (FI); Jorma Sarkkinen, Helsinki (FI)

(73) Assignee: Kone Corporation, Helsinki (FI)

( * ) Notice: Subject to any disclaimer, the term of this patent is extended or adjusted under 35 U.S.C. 154(b) by 488 days.

(21) Appl. No.: 16/729,957

(22) Filed: Dec. 30, 2019

(65) Prior Publication Data
US 2020/0207575 A1 Jul. 2, 2020

(30) Foreign Application Priority Data
Dec. 31, 2018 (EP) .................................... 18215985

(51) Int. Cl.
*F16D 65/097* (2006.01)
*F16D 65/18* (2006.01)
(Continued)

(52) U.S. Cl.
CPC ............... *B66B 1/36* (2013.01); *B66B 3/002* (2013.01); *F16D 55/00* (2013.01); *F16D 63/00* (2013.01);
(Continued)

(58) Field of Classification Search
CPC ..... F16D 2055/0008; F16D 2055/0025; F16D 2055/0029; F16D 2055/0016;
(Continued)

(56) References Cited

U.S. PATENT DOCUMENTS 1,406,720 A * 2/1922 Booth ..................... F16D 65/04
  188/259
3,059,731 A * 10/1962 Gancel ................ F16D 55/2255
  188/71.9
(Continued)

FOREIGN PATENT DOCUMENTS

CN          108649740 A      10/2018
EP           988467 B1 *     10/2002  ............. B60T 13/74
(Continued)

OTHER PUBLICATIONS

Extended European Search Report for European Application No. 18215985.5 dated Oct. 25, 2019.
(Continued)

*Primary Examiner* — Thomas J Williams
(74) *Attorney, Agent, or Firm* — Harness, Dickey & Pierce, P.L.C.

(57) ABSTRACT

According to an aspect, there is provided an elevator car parking brake comprising a brake carrier having a first plate and a second plate, the plates being spaced from each other and positioned to enable a guide rail to travel within the space between the plates, a caliper movably connected to the brake carrier, brake pads, and an actuator configured to move the brake pads against a guide rail in a braking operation. The elevator car parking brake further comprises at least one first compression spring arranged between the first plate of the brake carrier and a brake pad directly associated with the actuator; and at least one second compression spring arranged between the second plate of the brake carrier and the caliper, the first and second compression springs being configured to keep the brake pads substantially centered with respect to the brake carrier.

13 Claims, 6 Drawing Sheets

(51) Int. Cl.
*F16D 66/02* (2006.01)
*B66B 1/36* (2006.01)
*B66B 3/00* (2006.01)
*F16D 55/00* (2006.01)
*F16D 63/00* (2006.01)
*F16D 65/00* (2006.01)
*F16D 66/00* (2006.01)
*F16D 121/24* (2012.01)

(52) U.S. Cl.
CPC ....... *F16D 65/005* (2013.01); *F16D 65/0972* (2013.01); *F16D 65/183* (2013.01); *F16D 66/022* (2013.01); *F16D 2066/006* (2013.01); *F16D 2121/24* (2013.01)

(58) Field of Classification Search
CPC ............... F16D 65/005; F16D 65/0056; F16D 65/0068; F16D 65/095; F16D 65/0972; F16D 65/183; F16D 63/002; F16D 63/006; F16D 63/008; F16D 66/02; F16D 66/021; F16D 66/022; B66B 1/36; B66B 1/365
USPC ...................................................... 188/28, 68
See application file for complete search history.

(56) References Cited

U.S. PATENT DOCUMENTS

| | | | | |
|---|---|---|---|---|
| 3,095,949 A | * | 7/1963 | Butler | ................... F16D 55/224 |
| | | | | 188/71.9 |
| 4,044,862 A | * | 8/1977 | Savarimuthu | ............. B60T 1/14 |
| | | | | 180/164 |
| 2008/0128218 A1 | | 6/2008 | Gremaud et al. | |
| 2017/0291794 A1 | * | 10/2017 | Bitzi | ......................... B66B 1/32 |
| 2020/0207575 A1 | * | 7/2020 | Koskinen | ................ B66B 17/34 |

FOREIGN PATENT DOCUMENTS

| | | | | |
|---|---|---|---|---|
| EP | 2135832 A1 | * | 12/2009 | ............... B66B 5/18 |
| EP | 3287337 A1 | * | 2/2018 | ............... B61H 5/00 |
| EP | 3388380 A1 | | 10/2018 | |
| JP | 2003-182945 A | | 7/2003 | |

OTHER PUBLICATIONS

Chinese Office Action dated Oct. 25, 2022 for corresponding Chinese Application No. 201911401521.7.

* cited by examiner

ELEVATOR CAR PARKING BRAKE

RELATED APPLICATIONS

This application claims priority to European Patent Application No. 18215985.5 filed on Dec. 31, 2018, the entire contents of which are incorporated herein by reference.

BACKGROUND

An elevator car needs to be kept within a door zone at a landing so that a car door sill and a landing door sill are on the same level for safe boarding and exit of passengers. Due to elasticity of hoisting ropes, a load change in the elevator car and the resulting tension change in the hoisting ropes will move the car and create a step between the car and landing posing a tripping hazard. Relevelling of the car by machinery is a known method for preventing such a tripping hazard. However, precision positioning of the car is a complex task and the dynamic load change during loading and unloading of the car will most likely make the process iterative.

A parking brake solves the problem that is due the suspension elasticity during loading and unloading. The parking brake holds the elevator in its place during loading and unloading and releases its grip after the load has been transferred to the suspension ropes and the car and landing doors have been closed, before the elevator starts to run again.

As the parking brakes are engaged at every landing stop of the elevator car, they need to be reliable and endure long-term use. Therefore, there is a need for an elevator car parking brake solution that would provide a simple but efficient elevator car parking brake.

SUMMARY

According to a first aspect, there is provided an elevator car parking brake comprising a brake carrier having a first plate and a second plate, the plates being spaced from each other and positioned to enable a guide rail to travel within the space between the plates; a caliper movably connected to the brake carrier; brake pads; and an actuator configured to move the brake pads against the guide rail in a braking operation. The elevator car parking brake further comprises at least one first compression spring arranged between the first plate of the brake carrier and a brake pad directly associated with the actuator, and at least one second compression spring arranged between the second plate of the brake carrier and the caliper, the first and second compression springs being configured to keep the brake pads substantially centered with respect to the brake carrier.

In an embodiment, the caliper is movably connected to the brake carrier with sliding pins.

In an embodiment, the caliper is movably connected to the brake carrier with a hinged bracket providing a restricted movability for the caliper with respect to the brake carrier.

In an embodiment, the hinged bracket comprises bushings, wherein the bushings are used to movably connect the caliper and the brake carrier to the hinged bracket.

In an embodiment, alternatively or in addition, the actuator comprises an electro-mechanical linear actuator, a hydraulic cylinder, a pneumatic cylinder or a vacuum pump.

In an embodiment, alternatively or in addition, the brake pads comprise suction cups, and wherein the vacuum pump is configured to generate a breaking operation by producing a vacuum with the suctions cups with respect to the guide rail.

In an embodiment, alternatively or in addition, the actuator comprises an electro-mechanical linear actuator, and the elevator car parking brake further comprises a controller configured to calculate revolutions of the electro-mechanical linear actuator when the electro-mechanical linear actuator is operated to move the brake pads in the braking operation; and determine wearing of the brake pads based on the calculated revolutions.

In an embodiment, alternatively or in addition, the controller is configured to issue a wearing alert when the number of revolutions exceeds a predefined threshold value.

In an embodiment, alternatively or in addition, the elevator car parking brake further comprises a compression spring between a brake pad and the actuator.

According to a second aspect, there is provided an elevator car comprising at least one elevator car parking brake of the first aspect.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

Figure 1A:
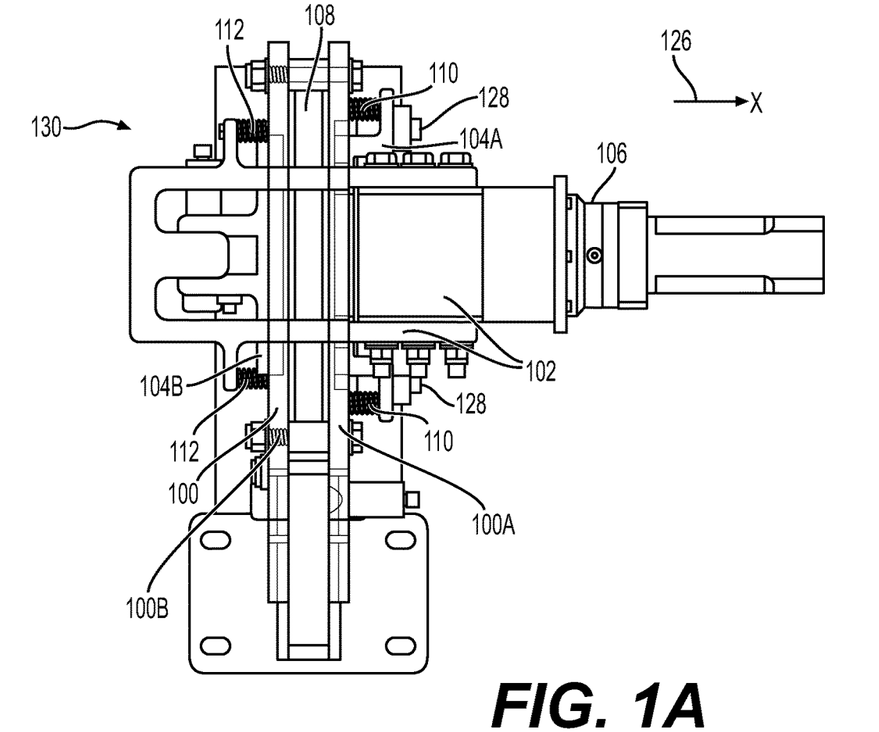
FIG. 1A illustrates an elevator car parking brake according to an embodiment.

FIG. 1A illustrates an elevator car parking brake 130 according to an embodiment. An elevator car parking brake holds an elevator in its place during loading and unloading and releases its grip after the load has been transferred to suspension ropes and car and landing doors have been closed, before the elevator starts to run again.

The elevator car parking brake 130 comprises a brake carrier 100 having a first plate 100A and a second plate 100B, and a caliper 102 movably connected to the brake carrier 100. The plates 100A, 100B may be spaced from each other and positioned from each other and positioned to enable a guide rail 108 to travel within the space between the plates 100A, 100B. The elevator car parking brake 130 further comprises brake pads 104A, 104B and an actuator 106 configured to move the brake pads 104A, 104B against the guide rail 108 in a braking operation. The actuator 106 is fixedly connected to the brake caliper 102.

The elevator car parking brake 130 also comprises at least one first spring 110 as a synchronizing spring, arranged between the brake carrier 100 and the brake pad 104A, and at least one second compression spring 112 as a returning spring, arranged between the second plate 100B of the brake carrier 100 and the caliper 102. The first and second compression springs 110, 112 are configured to keep the brake pads 104A, 104B substantially centered with respect to the brake carrier 100. To keep substantially centered means that the brake pads 104A, 104B settle substantially equidistant with respect to the longitudinal center line of the brake carrier 100, and hence the guide rail 108. In other words, the distances from the brake pads 104A, 104B to the guide rail 108 are substantially the same. The elevator car parking brake 130 may further comprise sliding pins 128 with which the caliper 102 is slidably connected to the brake carrier 100. In other words, the sliding pins 128 enable movement of the caliper 102 with respect to the brake carrier 100 in the x and −x directions, hence enabling the centering action of the first and second compression springs 110, 112.

As already discussed above, the compression springs 110 can be regarded as synchronizing springs. As a piston comprising the brake pad 104A and moved by the actuator 106 is moving towards the guide rail 108, the synchronizing springs 110 are compressed and those start to push the caliper 102 to the x direction 126. The compression springs 112 on the other side between the caliper 102 and the brake carrier 100 can be regarded as returning springs. When the force in the synchronizing springs 110 exceeds the force of the returning springs 112, the caliper 102 moves in the x-direction 126. When stiffness of the synchronizing springs 110 and the returning springs 112 is selected correctly, the brake pads 104A, 104B will hit the guide rail 108 approximately simultaneously with sufficient accuracy. For example, the stiffness of the synchronizing springs 110 may be 1N/mm and the stiffness of the returning springs 112 may be 1N/mm. When the piston moves 1 mm (simultaneously moving the brake pads 104A, 104B 1 mm), the synchronizing springs 110 will push the caliper 102 with a force of 2N. Thus, the returning springs 112 are pushed with a force of 2N and they compress 1 mm. This also means that the piston has moved 1 mm towards the guide rail 108 and the caliper 102 has moved 1 mm in the x-direction 126.

The use of the first and second compression springs 110, 112 enables the simultaneous grip of the brake pads 104A, 104B on the guide rail 108.

Figure 1B:
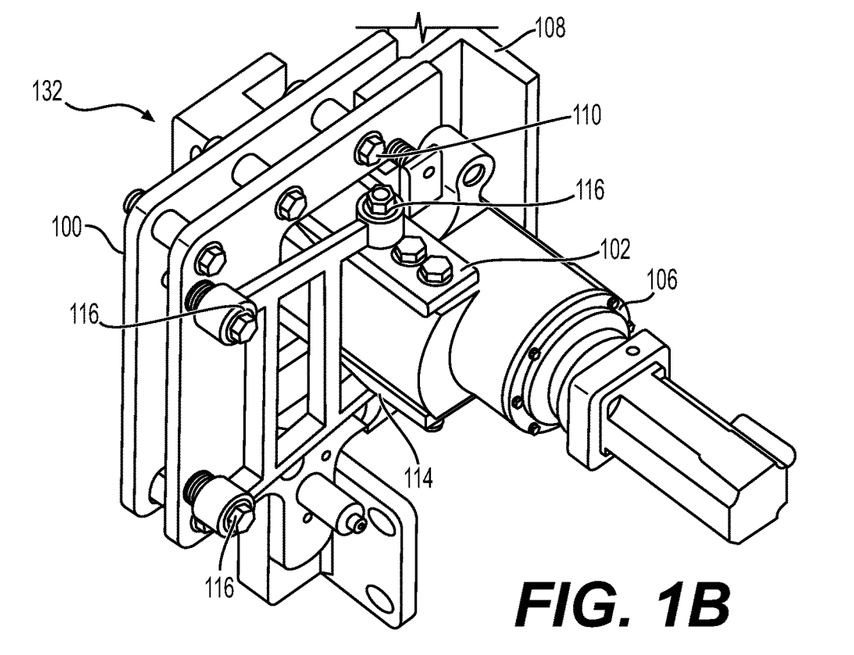
FIG. 1B illustrates an elevator car parking brake according to another embodiment.

FIG. 1B illustrates an elevator car parking brake 132 according to another embodiment. The elevator car parking brake 132 illustrated in FIG. 1B is similar to the elevator car parking brake 130 illustrated in FIG. 1A with the exception that the caliper 102 is fixed to the brake carrier 100 differently.

As illustrated in FIG. 1B, the caliper 102 is movably connected to the brake carrier 100 with a caliper carrier comprising a hinged bracket 114 and bushings 116 instead of sliding pins 128. The hinged bracket 114 may have an "H" type of structure. The hinged bracket 114 may consist of a single piece or several pieces such that it provides adequate rigidity in directions perpendicular to the x direction 126 illustrated in FIG. 1A. Consequently, the hinged bracket 114 may be made of, for example, steel, aluminum or a composite material providing sufficient strength to the structure. The bushings 116 may be made, for example, of rubber, polyurethane or other material providing a sufficient degree of mobility for the hinged bracket 114 to enable hinged caliper movement in x and −x directions illustrated in FIG. 1A.

In other words, the caliper 102 is movably connected to the brake carrier 100 with the hinged bracket 114, providing a restricted movability for the caliper 102 with respect to the brake carrier 100. As illustrated in FIG. 1B, the bushings 116 may be used to movably connect the caliper 102 and the brake carrier 100 to the hinged bracket 114. The bushings 116 allow the caliper 102 to move during a braking operation and brake release operation. The caliper carrier is manufactured so that it is rigid enough to carry the mass of the caliper 102. The forces resulting from a load change in an elevator car comprising the elevator car parking brake 132 are transmitted to the guide rail 108 by the caliper 102 resting within the brake carrier 100 and not via the caliper carrier.

Figure 1C:
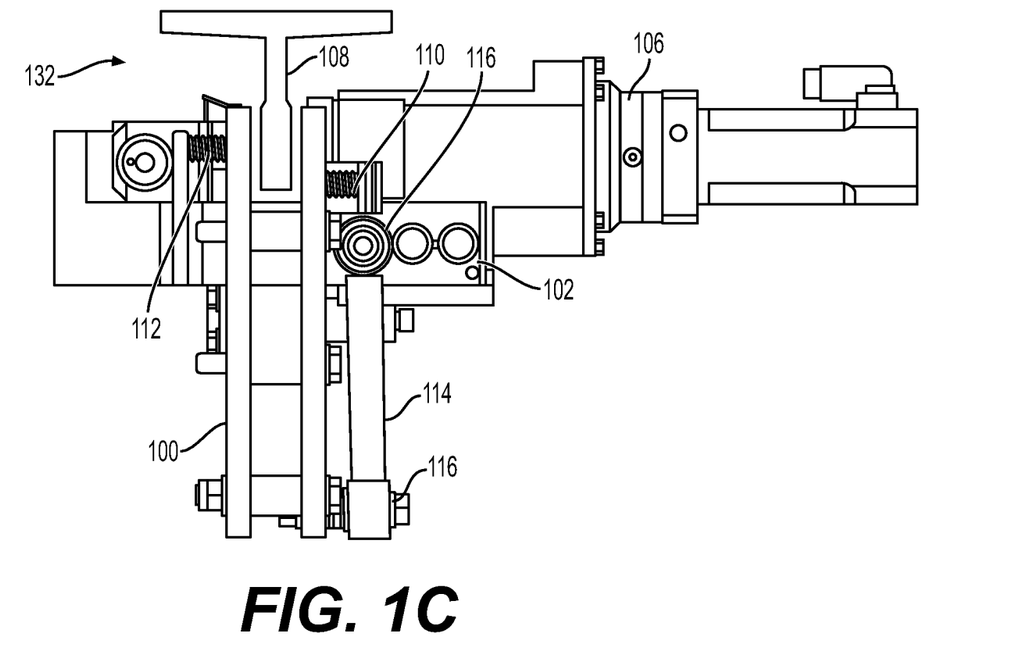
FIG. 1C illustrates a different view perspective of the elevator car parking brake illustrated in FIG. 1B.
Figure 1D:
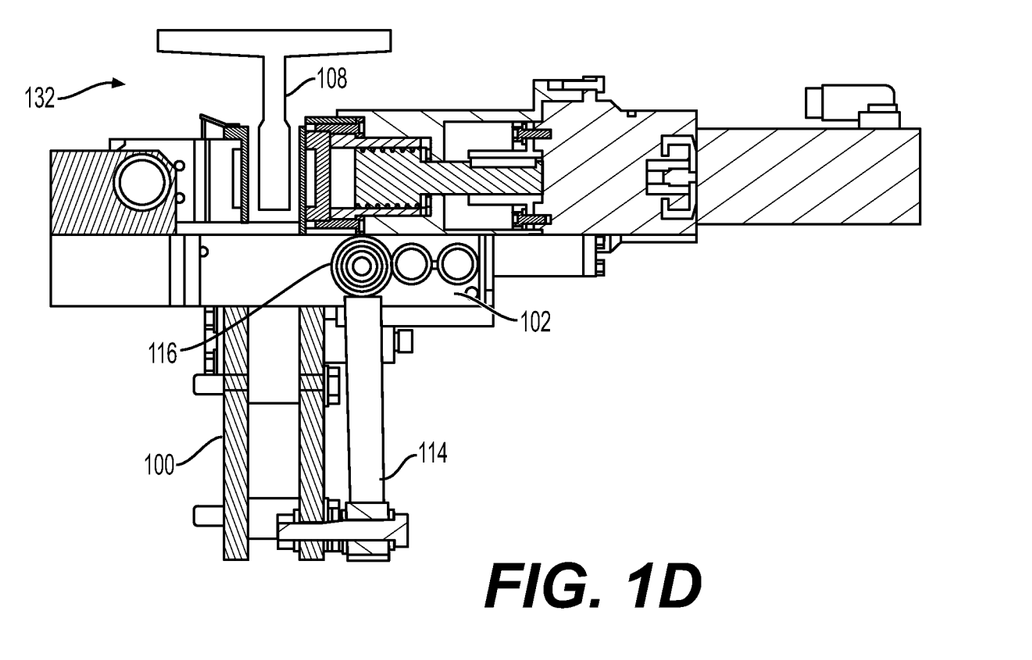
FIG. 1D illustrates a different view perspective of the elevator car parking brake illustrated in FIG. 1B.

FIGS. 1C and 1D illustrate different view perspectives of the elevator car parking brake 132. FIG. 1C illustrates the first and second compression springs 110, 112 configured to substantially center the caliper 102 with respect to the brake carrier 100.

In the braking operation, the piston pushes the brake pad 104A on the actuator 106 side, moving the caliper 102 to advance the brake pad 104B on the opposite side until both brake pads 104A, 104B hit the guide rail 108. The bushings 116 yield thus allowing the caliper 102 to move. Further, during the brake operation, the bushings 116 allow the caliper 102 to rotate and align itself in a direction perpendicular to the guide rail 108. In the brake release operation, the returning springs 112 push the caliper 102 back to its initial position. FIG. 1D illustrates a situation in which the bushings 116 yield and the caliper 102 can move during the braking operation. The bushings 116 allow the caliper 102 to rotate towards the guide rail 108 in the braking operation.

By enabling the movement of the caliper 102 with respect to the brake carrier 100 with the caliper carrier as illustrated in FIGS. 1B-1D, manufacturing costs may be reduced. The caliper carrier is also functionally reliable as it is dirt and dust resistive as there are no sliding surfaces.

Figure 1E:
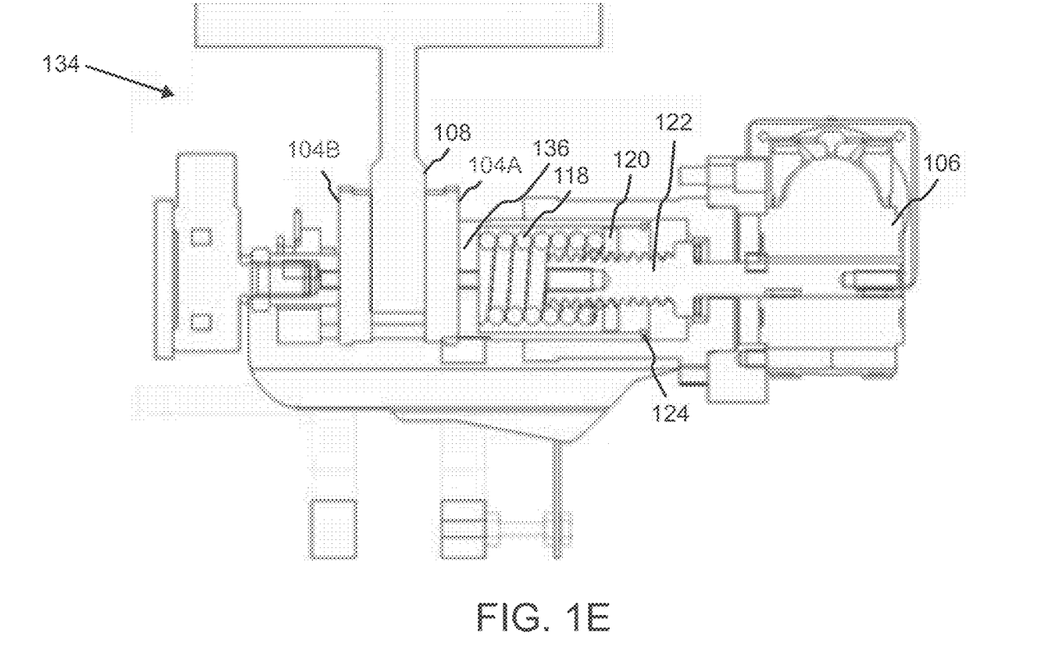
FIG. 1E illustrates an elevator car parking brake according to another embodiment.

FIG. 1E illustrates an elevator car parking brake 134 according to another embodiment. The overall structure of the elevator car parking brake 134 may correspond to that of the elevator car parking brakes 130, 132 with the exception that the elevator car parking brake 134 additionally comprises a compression spring 118 between the brake pad 104A and the actuator 106.

The arrangement illustrated in FIG. 1E comprises a piston 136 moving the brake pad 104A configured to provide a braking force when pressed against the guide rail 108, conveying means 120 and a compression spring 118 arranged between the piston 136 and the conveying means 120. The actuator 106 is configured to move the conveying means 120. In the braking operation, the conveying means 120 moved by the actuator 106 in a first direction, i.e. towards the guide rail 108, is configured to press against the compression spring 118, thus providing a gradually increasing braking force to the piston 136 via the compression spring 118. In a brake release operation, the conveying means 120 moved by the actuator 106 in a second direction opposite to the first direction is configured to allow decompression of the compression spring 118, thus gradually diminishing the braking force provided by the compression spring 118 to the piston 136.

The elevator car parking brake 134 may also comprise a retainer ring 124. When the conveying means 120 reach the retainer ring 124 when moving to the second direction, the retainer ring 124 is configured to keep the conveying means 120 within the piston 136 to pull the piston 136 off from the guide rail 108. The conveying means 120 may comprise a thrust nut having an internal thread, and the actuator 106 may comprise a shaft 122 having an external thread corresponding to the internal thread of the thrust nut. The actuator 106 is configured to rotate the shaft 122 to move the thrust nut towards the compression spring 118 or away from the compression spring 118.

Figure 1F:
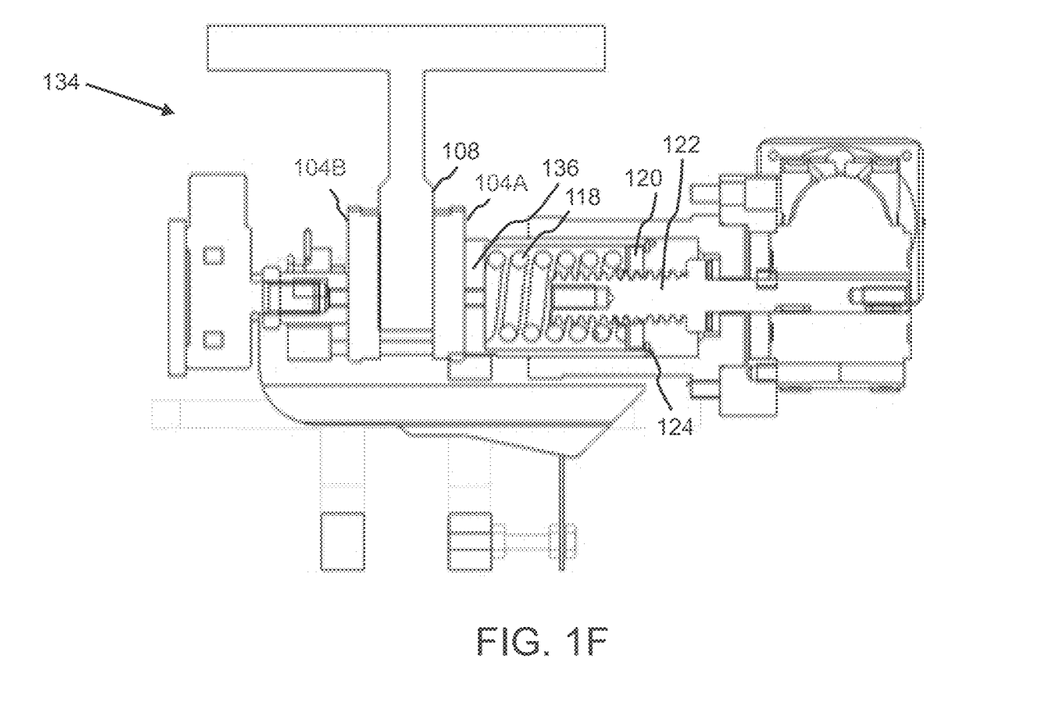
FIG. 1F illustrates a different operation state of the elevator car parking brake illustrated in FIG. 1E.
Figure 1G:
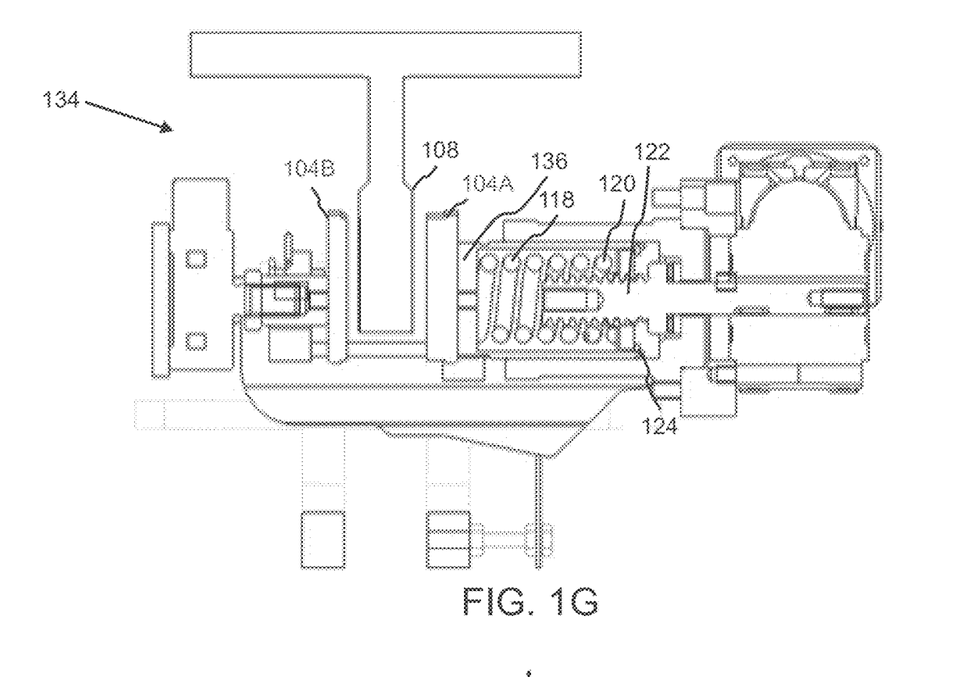
FIG. 1G illustrates a different operation state of the elevator car parking brake illustrated in FIG. 1E.

FIGS. 1F and 1G illustrate the brake release operation in more detail. A smooth release of the elevator car parking brake 134 is achieved with the compression spring 118. When doors of an elevator car open and the elevator car parking brake 134 holds the elevator car in its place, the actuator 106 is compressing the compression spring 118 fully and the braking force comes straight from the torque of the actuator 106. When the elevator car doors start to close, the actuator 106 starts to open the elevator car parking brake. When the compression spring 118 is less than fully compressed, the braking force is based on spring compression rather than the torque from the actuator 106. As the spring length is growing, the compression is simultaneously diminishing. The actuator 106 operating speed may be chosen such that the compression spring 118 is released at an appropriate speed and the elevator car slides smoothly. When the compression spring 118 is in a released state, the piston 136 hits the retaining ring 124 that keeps the thrust nut in the piston 136, pulling the piston 136 off from the guide rail 108. The compression springs 110, 112 then push the brake pad 104B on the other side of the guide rail 108 off from the guide rail 108.

An advantage associated with the embodiment illustrated in FIGS. 1E-1G is that for a smooth parking brake actuation and release there is no need for a servo motor control for the actuator 106. A simple electric motor can be used which makes the solution cheaper to implement. The embodiment illustrated in FIGS. 1E-1G also improves the reliability of the elevator car parking brake as the smooth, sliding start and stop of the elevator car is achieved mechanically.

FIGS. 2A-2D illustrate an elevator car parking brake 210 implemented as a vacuum brake according to another embodiment.

Figure 2A:
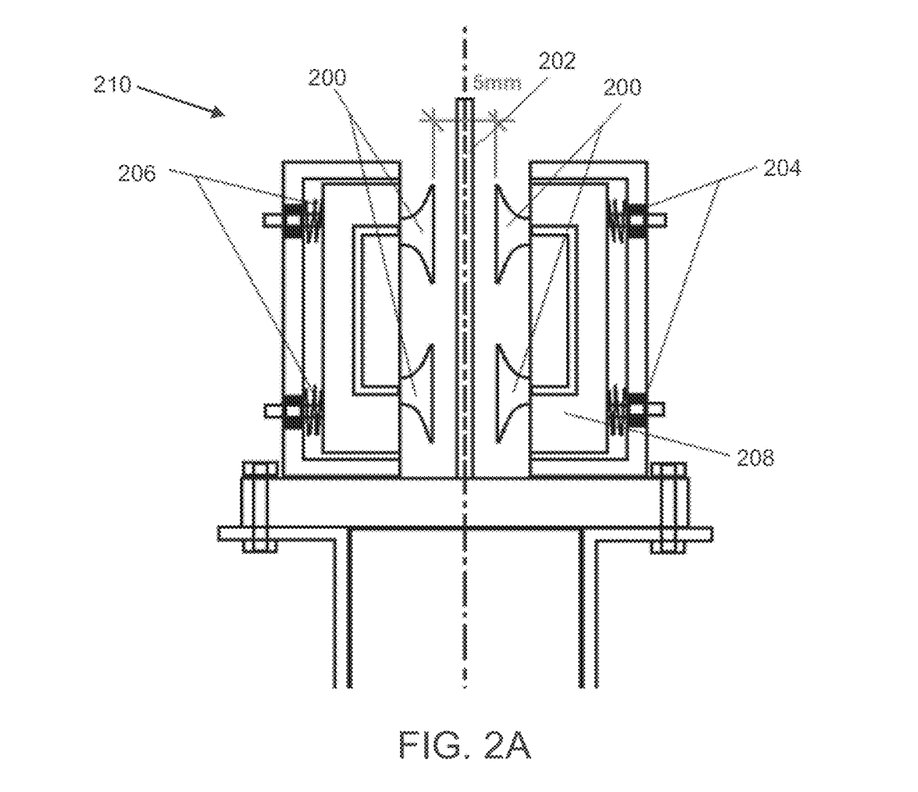
FIG. 2A illustrates an elevator car parking brake according to another embodiment.
Figure 2B:
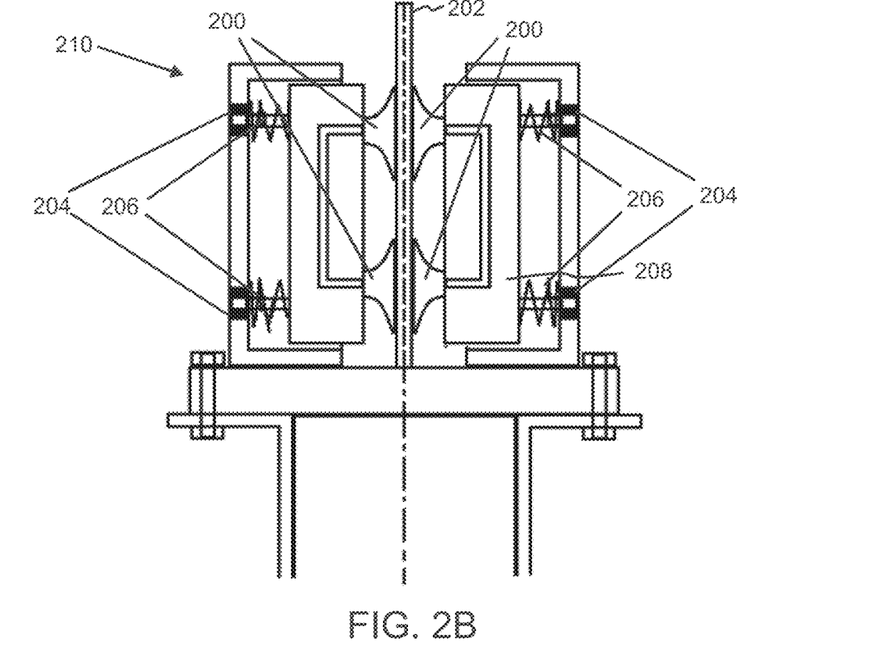
FIG. 2B illustrates a different operation state of the elevator car parking brake illustrated in FIG. 2A.
Figure 2C:
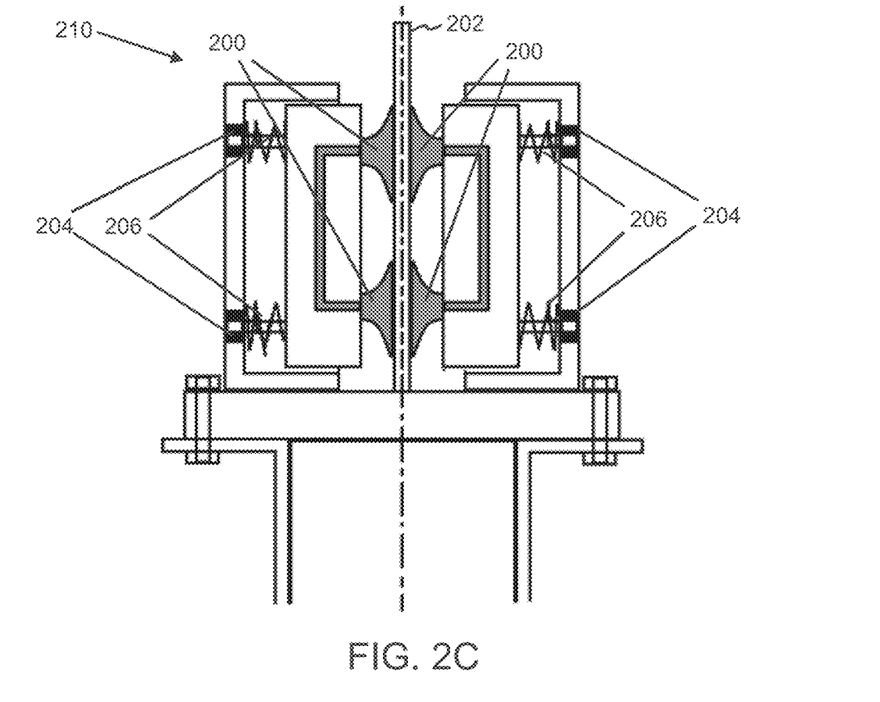
FIG. 2C illustrates a different operation state of the elevator car parking brake illustrated in FIG. 2A.

When the vacuum brake is in the brake operation state, a load of an elevator car is carried with suction cups 200 that are pushed against a guide rail 202. Solenoids 204 may hold the suction cups 200 away from the guide rail 202 during the elevator run. The distance of the suctions cups 200 from the guide rail is, for example, 5 mm. When elevator car is stationary at a landing, the solenoids 204 are released and springs 206 push the floating suction cups 200 against the guide rail 202, as illustrated in FIG. 2B. After the floating suction cups 200 have been pushed against the guide rail 202, the vacuum is activated with a vacuum pump 212, as illustrated in FIG. 2C.

Alternatively, during the elevator run, the suction cups 200 may be held away from the guide rail 202 by springs. In such case, upon a stop at a landing, the solenoids 204 may be energized to push the suction cups 200 against the guide rail 202.

For both alternatives, pneumatic cylinders can be used instead of solenoids 204.

Yet alternatively, the suction cups 200 may be mounted on a brake caliper structure instead of friction pads 208.

Figure 2D:
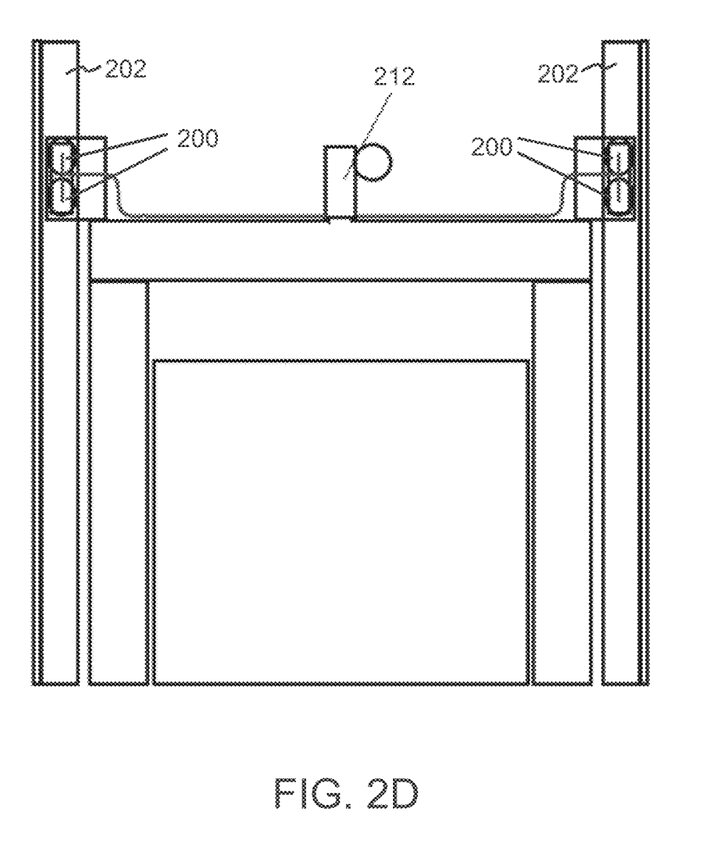
FIG. 2D illustrates a different view perspective of the elevator car parking brake illustrated in FIG. 2A.

FIG. 2D illustrates that there may be only one vacuum pump 212 that produces the vacuum for two brakes sides. In other embodiments, multiple vacuum pumps can be used. On each brake side, there may be two or more suction cups 200. The number of the suction cups 200 may vary and depend on a rated load of the elevator car and the and vacuum force. On suction cup 200 borders, some friction material may be provided to increase the holding force to the guide rail 202.

An advantage of the embodiment illustrated in FIGS. 2A-2D may be that there can be only one pump that produces the holding force. The location of the vacuum pump can flexible. Further, pneumatic force generation is quiet and fast and there is no need for lubricants. Additionally, the structure of the vacuum brake is simple and cost-effective to implement.

In any of the embodiments illustrated in FIGS. 1A-1G, the actuator 106 may comprise an electro-mechanical linear actuator, a hydraulic cylinder, a pneumatic cylinder or a vacuum pump.

When using the electro-mechanical linear actuator, the elevator car parking brake may further comprise a controller configured to calculate revolutions of the electro-mechanical linear actuator, for example by an encoder, when the electro-mechanical linear actuator is operated to move the brake pads in the braking operation, and to determine wearing of the brake pads 104A, 104B based on the calculated revolutions. When the brake pads 104A, 104B wear out, they need to be moved a longer distance towards side surfaces of the guide rail 108 in order to achieve a proper braking state. This means that the electric motor has to be operated longer (i.e. the number of revolutions performed by the electric motor increases) in order to achieve a proper braking state. The controller may also be configured to issue a wearing alert when the number of revolutions exceeds a predefined threshold value. This may also mean that the brake pads may need to be replaced with new ones.

When implementing determination of rotated full rounds and an angle inside one round of the electro-mechanical linear actuator, a very low-cost solution for elevator car brake pad wearing can be implemented. The disclosed solution also enables remote detection of brake pad wearing.

While there have been shown and described and pointed out fundamental novel features as applied to preferred embodiments thereof, it will be understood that various omissions and substitutions and changes in the form and details of the devices and methods described may be made by those skilled in the art without departing from the spirit of the disclosure. Moreover, it should be recognized that structures and/or elements and/or method steps shown and/or described in connection with any disclosed form or embodiments may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. An elevator car parking brake comprising:
a brake carrier having a first plate and a second plate, the first plate and the second plate spaced apart from each other and configured to enable a guide rail to travel within a space between the first plate and the second plate;
a caliper movably connected to the brake carrier;
a first brake pad and a second brake pad, the first and second brake pads configured to be on opposite sides of the guide rail;
an actuator configured to move the first and second brake pads toward the guide rail in a braking operation, such that the actuator causes the first brake pad to move toward the guide rail in a first direction and further causes the caliper to move the second brake pad toward the guide rail in an opposite, second direction, wherein the first brake pad is configured to be between the actuator and the guide rail, and
the second brake pad is configured to be on an opposite side of the guide rail from the actuator;
at least one first compression spring between the first plate of the brake carrier and at least a portion of the first brake pad such that the at least one first compression spring is configured to be between the guide rail and the portion of the first brake pad, the at least one first compression spring configured to be compressed between the portion of the first brake pad and the first plate of the brake carrier based on the first brake pad moving toward the guide rail in the first direction such that the portion of the first brake pad moves towards the first plate of the brake carrier in the first direction; and
at least one second compression spring between the second plate of the brake carrier and at least a portion of the caliper, the at least one second compression spring configured to be compressed between the portion of the caliper and the second plate of the brake carrier based on the second brake pad moving toward the guide rail in the second direction,
wherein the first and second compression springs are configured to keep the first and second brake pads substantially centered with respect to the brake carrier.

2. The elevator car parking brake of claim 1, wherein the caliper is movably connected to the brake carrier with sliding pins.

3. The elevator car parking brake of claim 1, wherein the caliper is movably connected to the brake carrier with a hinged bracket, the hinged bracket configured to provide a restricted movability of the caliper with respect to the brake carrier.

4. The elevator car parking brake of claim 3, wherein
the hinged bracket includes bushings, the bushings configured to movably connect the caliper and the brake carrier to the hinged bracket.

5. The elevator car parking brake of claim 1, wherein the actuator includes an electro-mechanical linear actuator, a hydraulic cylinder, a pneumatic cylinder, or a vacuum pump.

6. The elevator car parking brake of claim 5, wherein
the actuator comprises the vacuum pump,
the first and second brake pads comprise suction cups, and
the vacuum pump is configured to generate the braking operation based on producing a vacuum in the suction cups with respect to the guide rail.

7. The elevator car parking brake of claim 5, wherein
the actuator includes the electro-mechanical linear actuator, and
the elevator car parking brake further includes a controller configured to:
calculate revolutions of the electro-mechanical linear actuator when the electro-mechanical linear actuator is operated to move the first and second brake pads in the braking operation; and
determine wearing of the first and second brake pads based on the calculated revolutions.

8. The elevator car parking brake of claim 7, wherein the controller is configured to issue a wearing alert when a number of calculated revolutions exceeds a threshold value.

9. The elevator car parking brake of claim 1, further comprising:
a third compression spring between the first brake pad and the actuator.

10. An elevator car comprising at least one elevator car parking brake of claim 1.

11. The elevator car parking brake of claim 1, wherein a stiffness of the at least one first compression spring is 1N/mm and a stiffness of the at least one second compression spring is 1N/mm.

12. The elevator car parking brake of claim 1, wherein the caliper is configured to
move in the second direction in response to a force applied by the at least one first compression spring exceeding a force applied by the at least one second compression spring, and
move in the first direction in response to the force applied by the at least one second compression spring exceeding the force applied by the at least one first compression spring.

13. A method of operating the elevator car parking brake of claim 1, the method comprising:
causing the actuator to move the first brake pad toward the guide rail to compress the at least one first compression spring; and
causing the caliper to move in the second direction to move the second brake pad toward the guide rail and to compress the at least one second compression spring between the portion of the caliper and the second plate of the brake carrier, based on the at least one first compression spring being compressed between the portion of the first brake pad and the first plate of the brake carrier as a result of the first brake pad moving in the first direction toward the guide rail, such that the first and second brake pads contact the guide rail approximately simultaneously.

* * * * *